US008593297B2

(12) United States Patent
Kim et al.

(10) Patent No.: US 8,593,297 B2
(45) Date of Patent: Nov. 26, 2013

(54) WALKING GUIDANCE APPARATUS USING HUMAN BODY COMMUNICATION

(75) Inventors: Jung Bum Kim, Daejeon (KR); Jung Hwan Hwang, Daejeon (KR); Tae Young Kang, Daejeon (KR); Tae Wook Kang, Daejeon (KR); Kyung Soo Kim, Daejeon (KR); Sung Eun Kim, Seoul (KR); Kyung Hwan Park, Daejeon (KR); Hyung Il Park, Daejeon (KR); In Gi Lim, Daejeon (KR); Byoung Gun Choi, Daegu (KR); Seok Bong Hyun, Daejeon (KR); Chang Hee Hyoung, Daejeon (KR); Sung Weon Kang, Daejeon (KR); Jin Kyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 12/950,984

(22) Filed: Nov. 19, 2010

(65) Prior Publication Data
US 2011/0148652 A1    Jun. 23, 2011

(30) Foreign Application Priority Data

Dec. 22, 2009 (KR) .................. 10-2009-0129263
Jun. 16, 2010 (KR) .................. 10-2010-0057035

(51) Int. Cl.
*G08B 7/00* (2006.01)

(52) U.S. Cl.
USPC ............. 340/691.1; 340/550; 340/384.3; 340/572.4; 340/572.7; 340/572.8; 235/375; 235/449; 235/492

(58) Field of Classification Search
USPC ......... 340/691.1, 550, 384.3, 572.4–572.8; 235/375, 449, 492; 343/112, 114, 116
See application file for complete search history.

(56) References Cited

U.S. PATENT DOCUMENTS

| | | | | |
|---|---|---|---|---|
| 5,807,111 A * | 9/1998 | Schrader | ................ | 434/112 |
| 6,754,472 B1 * | 6/2004 | Williams et al. | ............ | 455/100 |
| 7,546,204 B2 * | 6/2009 | Yoshimine | ................ | 701/433 |
| 8,081,226 B2 * | 12/2011 | Yanagidate | ............... | 348/211.1 |
| 2006/0129308 A1 | 6/2006 | Kates | | |
| 2006/0136015 A1 * | 6/2006 | Park et al. | ................ | 607/60 |
| 2006/0252371 A1 | 11/2006 | Yanagida | | |
| 2007/0096908 A1 * | 5/2007 | Chu et al. | ................ | 340/572.1 |
| 2008/0284607 A1 | 11/2008 | Hyoung et al. | | |
| 2010/0274083 A1 | 10/2010 | Hyoung et al. | | |

FOREIGN PATENT DOCUMENTS

| | | |
|---|---|---|
| JP | 2004-309305 A | 11/2004 |
| JP | 2006-303736 A | 11/2006 |
| JP | 2007-050191 A | 3/2007 |
| JP | 2009-085784 A | 4/2009 |
| KR | 10-2007-0061251 A | 6/2007 |
| KR | 10-2009-002857 A | 2/2009 |
| KR | 10-2009-0064939 A | 6/2009 |
| KR | 20-2009-0008865 U | 9/2009 |

* cited by examiner

*Primary Examiner* — Tai T Nguyen

(57) ABSTRACT

A walking guidance apparatus using human body communication, including: a first human body communication device acquiring a walking guidance information signal, converting the acquired walking guidance information signal into a signal available for human body communication, and transmitting the converted signal through a user's body; and a second human body communication device receiving the signal transmitted through the user's body from the first human body communication device, converting the received signal into a signal that can be recognized by the user, and outputting the converted signal. Walking guidance information having a high privacy function and high stability and accuracy can be provided to enhance user convenience.

13 Claims, 5 Drawing Sheets

WALKING GUIDANCE APPARATUS USING HUMAN BODY COMMUNICATION

CROSS-REFERENCE TO RELATED APPLICATIONS

This application claims the priority of Korean Patent Application Nos. 10-2009-129263 filed on Dec. 22, 2009 and 10-2010-057035 filed on Jun. 16, 2010, in the Korean Intellectual Property Office, the disclosures of which are incorporated herein by reference.

BACKGROUND OF THE INVENTION

1. Field of the Invention

The present invention relates to a walking guidance apparatus adaptive for the visually impaired and, more particularly, to a walking guidance apparatus capable of providing walking guidance to the visually impaired through human body communication.

2. Description of the Related Art

In general, the visually impaired recognize their location or a risk factor by detecting a guide block installed in the middle of a footpath, a sidewalk, or a pavement to guide them to a crossing, a door of a vehicles, stairways, and the like, which needs an attention or to a particular location in using a stick while on the move.

Research and development have been conducted to provide more convenient and safer walking guidance information to the visually impaired by applying an IT and communication technique to the guidance stick always carried around by the visually impaired, in line with the advancement of IT technology.

For example, devices and methods of installing an integrated circuit having a communication function in a stick, receiving information provided from communication systems installed on the road, processing the received information, and providing audible walking guidance information to the visually impaired have been proposed as the application of IT and communications technique for allowing the visually impaired to safely walk.

For example, research outcomes of a walking guidance information providing technique, based on a traffic communication environment in which road status information such as road locations, geographical changes, obstacles, construction sites, temperature, humidity, pollution status, congestion, and the like, are mounted in an intelligent transfer system (ITS) installed on roads or in particular sites of structures, have been presented.

Examples of utilizing the ITS with sticks for the visually impaired include devices and methods of receiving walking guidance information by applying RFID, GPS, infrared light or visible light communication scheme to the sticks, and providing the received walking guidance information to the visually impaired.

Among the foregoing methods, the visible light communication scheme is currently under discussion by an international standardization group (IEEE 802.15.7). The visible light communication scheme is advantageous in that various types of road status information can be acquired without having to alter existing traffic lights or illumination facilities, and when bi-directional communications are realized, an optimum communication environment in which a user can be informed of a dangerous situation in real time can be established. For example, the use of the visible light communication scheme allows for the easy acquisition of various types of road status information, including location information on the roads or indoor and outdoor areas by simply replacing light sources of traffic lights or illumination facilities with LED (Light Emitting Diodes) elements for visible light communications, unlike the GPS scheme.

Meanwhile, in order to provide acquired walking guidance information to users, the sticks of the visually impaired having the conventional communication function as described above use a method of providing walking guidance information through an earphone connected to the stick or a method of providing walking guidance information by using Bluetooth™ communication scheme.

When road information is provided to the visually impaired by using an earphone, an earphone connection line connected to the stick may be disconnected, the stick and the earphone connection line may be in poor contact with each other, or the earphone connection line may become entangled or stuck, so the visually impaired must pay careful attention to their movements, and in this case, a psychological feeling of insecurity may be caused while the visually impaired use their stick.

Meanwhile, when the acquired walking guidance information is provided by using Bluetooth™, because a Bluetooth™ function is added to a communication device installed in the stick to transmit an audible signal, crosstalk or jamming may be caused according to a walking environment of the visually impaired, which may result in a failure of receiving importance road information to potentially put the visually impaired into a serious risky situation in terms of security and safety.

SUMMARY OF THE INVENTION

An aspect of the present invention provides a walking guidance apparatus using human body communication capable of accurately providing walking guidance information and improving user convenience.

According to an aspect of the present invention, there is provided a walking guidance apparatus using human body communication, including: a first human body communication device acquiring a walking guidance information signal, converting the acquired walking guidance information signal into a signal available for human body communication, and transmitting the converted signal through a user's body; and a second human body communication device receiving the signal transmitted through the user's body from the first human body communication device, converting the received signal into a signal that can be recognized by the user, and outputting the converted signal.

The first human body communication device may include: a optical detection unit detecting a visible light data signal and converting the detected visible light data signal into an electrical signal; a first communication unit modulating the electrical signal provided from the optical detection unit and providing the modulated signal; and a first electrode receiving the modulated signal from the first communication unit and providing the received modulated signal to the user's body.

The first communication unit may include: a first reception module demodulating the electrical signal provided from the optical detection unit; and a first transmission module receiving the demodulated electrical signal from the first reception module and modulating the demodulated electrical signal into a signal that can be transmittable through the user's body.

The first transmission module may perform BPSK (Binary Phase Shift Keying) modulation.

The first human body communication device may include: a first controller performing user authentication by using predetermined authentication information when the first human body communication device is brought into contact with the user's body; and a storage unit storing user authentication information for authenticating the user.

The second human body communication device may include: a second electrode brought into contact with the user's body to receive a signal transmitted from the first human body communication device; a second communication unit demodulating the signal received through the second electrode and providing a demodulated signal; and a voice processing unit dealing the demodulated signal to output a voice signal.

The voice processing unit may generate a voice signal corresponding to the signal which has been transmitted from the first human body communication device and output the generated voice signal.

The voice processing unit may include a database storing a voice to be output corresponding to the provided signal.

The voice processing unit may further include a digital signal processing module converting voice data into a voice signal and outputting the converted voice signal, when a provided signal is the voice data.

The voice processing unit may provide the provided signal as a voice to the user by using human body sound communication.

The first human body communication device may detect one of an RFID signal, an infrared signal, and a GPS signal to acquire the walking guidance information signal, convert the acquired walking guidance information signal into a signal available for human body communication, and then transmit the converted signal through the user's body.

According to another aspect of the present invention, there is provided a walking guidance apparatus using human body communication, including: a first human body communication device detecting a visible light signal including walking guidance information, processing the detected visible light signal, and transmitting the processed visible light signal through a user's body; and a second human body communication device receiving the signal which has been transmitted through the user's body from the first human body communication device and processing the received signal to output a voice signal corresponding to the received signal, converting a voice signal provided from the user into a visible light signal, and outputting the converted visible light signal.

The second human body communication device may include: a second electrode brought into contact with the user's body to receive the signal which has been transmitted from the first human body communication device; a second communication unit demodulating the signal received through the second electrode to provide the demodulated signal, and reversely modulating provided user's voice data to provide a modulated signal; a voice processing unit dealing the demodulated signal to output a voice signal, converting a voice provided from the user into the voice data, and providing the converted voice data to the second communication unit; and a light emission unit outputting a visible light signal corresponding to the modulated signal provided from the second communication unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
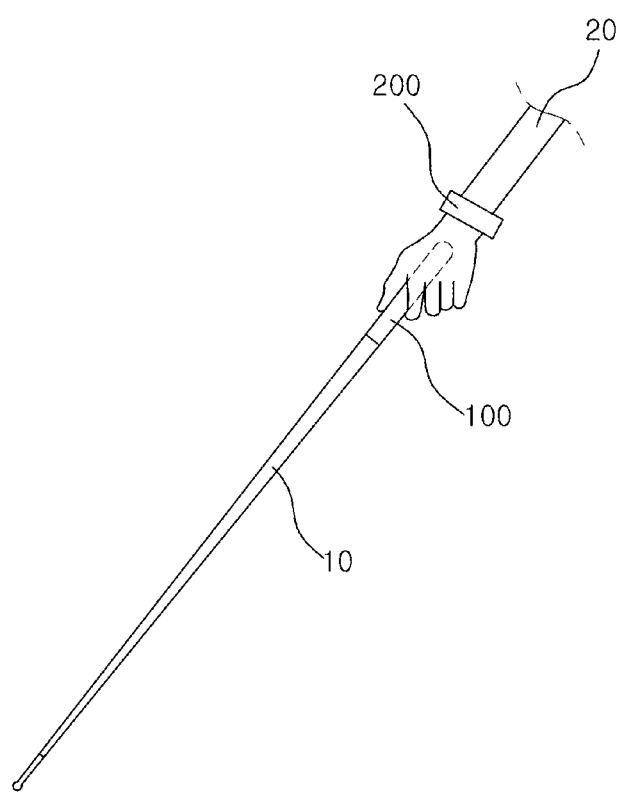
FIG. 1 is a conceptual view for explaining an example of a walking guidance apparatus using human body communication according to an exemplary embodiment of the present invention.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses either combinations of the plurality of related items disclosed or any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Hereinafter, walking guidance information provided to a user through a walking guidance apparatus according to an exemplary embodiment of the present invention is a concept including every type of information that can be obtained by the walking guidance apparatus from surrounding environments, such as a road location, a change in topography, an obstacle, the presence or absence of a construction site, temperature, humidity, a pollution state, traffic congestion, signal status information of a traffic light, and the like.

FIG. 1 is a conceptual view for explaining an example of a walking guidance apparatus using human body communication according to an exemplary embodiment of the present invention. Specifically, FIG. 1 illustrates a case in which human body communication devices are installed in a stick and a user's body to provide walking guidance information to the user by using the user's body as a communications channel.

With reference to FIG. 1, a walking guidance apparatus using human body communication according to an exemplary embodiment of the present invention may include a first human body communication device 100 and a second human body communication device 200. The first human body communication device 100 may be installed in an object, such as a stick 10, which can be brought into contact with a user's body, and the second human body communication device 200 may be directly attached to the user's body 20 such as the user's wrist. The first human body communication device 100 and the second human body communication device 200 transmit and receive walking guidance information by using human body communication.

Human body communication is a communication technique of transmitting and receiving data by using a human body as a communications channel. The human body communication technique may be divided into a scheme using a change in current flowing in the body and a scheme using a change in an electric field on the surface of a human body. Because a communication range and a counterpart can be specifically confined, the human body communication technique can advantageously reduce crosstalk or the possibility of wiretapping, unlike a call or radio communication. In the present exemplary embodiment, the first human body communication device 100 and the second human body communication device 200 may use one of conventional human body communication methods to perform human body communication with each other.

In FIG. 1, the first human body communication device 100 installed in the stick 10 may receive information transmitted from a traffic light having a visible light communication function, demodulate it, and deliver the demodulated information to the user's body through an electrode in contact with the user, and the second human body communication device 200 processes the information provided from the first human body communication device 100 by using the user's body and outputs a voice signal to allow the user to acquire the information by voice. Here, when the information transmitted through human body communication from the first human body communication device 100 is voice data, the second human body communication device 200 may demodulate the voice data and provide the same to the user, or when the provided information is simply a location signal (e.g., a GPS signal), rather than a direct voice signal, the second human body communication device 200 may generate a voice signal corresponding to the information and provide the voice signal to the user.

The first human body communication device 100 installed in the stick 10 may include an RFID reader capable of recognizing an RFID tag installed on the road or a facility, an infrared ray sensor capable of detecting an infrared ray light, a GPS reception module capable of receiving a GPS signal, or a communication module having a visible light communication function.

In FIG. 1, the first human body communication device 100 is installed in the stick 100 mainly used by the visibly impaired, but this is merely illustrative and the first human body communication device 100 may be installed in various other objects, such as a handle of a wheelchair, a handle of a walking aid, and the like, with which the user may come into contact. Here, the contact includes a user's direct contact with the first electrode 140 and a user's contact in a state of wearing gloves or the like while utilizing an antenna effect according to the material and size of the electrode.

Figure 2:
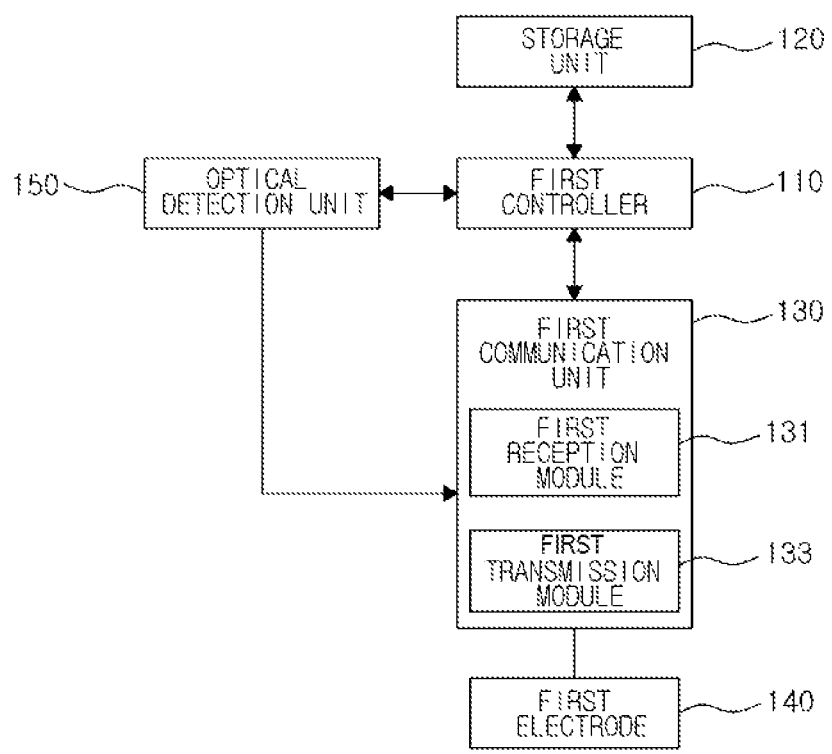
FIG. 2 is a schematic block diagram of a first human body communication device of the walking guidance apparatus using human body communication according to an exemplary embodiment of the present invention.

FIG. 2 is a schematic block diagram of the first human body communication device of the walking guidance apparatus using human body communication according to an exemplary embodiment of the present invention. Specifically, FIG. 2 shows a case in which the first human body communication device is configured to acquire walking guidance information by detecting a visible light signal.

With reference to FIG. 2, the first human body communication device 100 includes a first controller 110, a storage unit 120, a first communication unit 130, a first electrode 140, and a optical detection unit 150.

The first controller 110 controls and manages operations of all the elements included in the first human body communication device 100, and manages user recognition and authentication information, and the like. For example, when the user comes into contact with an object (e.g., a stick) in which the first human body communication device 100 is installed, the first controller 110 compares predetermined user authentication information with user authentication information stored in the storage unit 120. When the predetermined user authentication information is identical to the stored user authentication information, the first controller 110 may activate the operation of the first human body communication device 100, otherwise when the predetermined user authentication information is not identical to the stored user authentication information, the first controller 110 may deactivate the operation of the first human body communication device 100.

The storage unit 120 stores recognition information or authentication information for user recognition or authentication under the control of the first controller 110.

The first communication unit 130 may include a first reception module 131 and a first transmission module 133. The first communication unit 130 processes a data signal detected by the optical detection unit 150 and then transmits the processed data signal to the user's body through the first electrode 140 under the control of the first controller 110.

In detail, the first reception module 131 demodulates a visible light detection signal detected by the optical detection unit 150 and transfers the demodulated visible light detection signal to the first transmission module 133. Then, the first transmission module 133 modulates the data signal detected by the first reception module 131 according to a modulation control signal from the first controller 110 and transmits the modulated signal to the user's body through the first electrode 140. Here, the first transmission module 133 may modulate the received signal by employing various modulation methods generally used for a wireless communication technique. Preferably, the first transmission module 133 performs modulation according to a modulation method suitable for a human body communication standard. When the signal provided through the optical detection unit 150 is a relatively simple data signal such as coordinate information indicating a location or voice information, the first transmission module 133 may perform BPSK modulation which has high modulation efficiency at low speed.

The first electrode 140 performs a function of transmitting the data signal which has been transferred from the first communication unit 130 to the user's body. The first electrode 140 may be installed to be electrically connected to the first communication unit 130 to perform the foregoing function and installed at a position in which it will be contacted by the user's body. The first electrode 140 may be made of various materials correspondingly according to the shape of an object in which the first human body communication device 100 is installed.

The optical detection unit 150 may include a photodiode, whose implementation technique is known in the art, which detects light and converts the detected light into a corresponding electrical signal, and an amplifying circuit that amplifies a low voltage level into a pre-set level.

For example, optical detection unit 150 may detect a visible light signal provided from a traffic light composed of LED (Light Emitting Diode) elements transmitting road and traffic information through the photodiode, convert the detected visible light signal into an electrical signal, amplify the electrical signal to have a pre-set level, and transfer the amplified electrical signal to the first communication unit 130.

Figure 3:
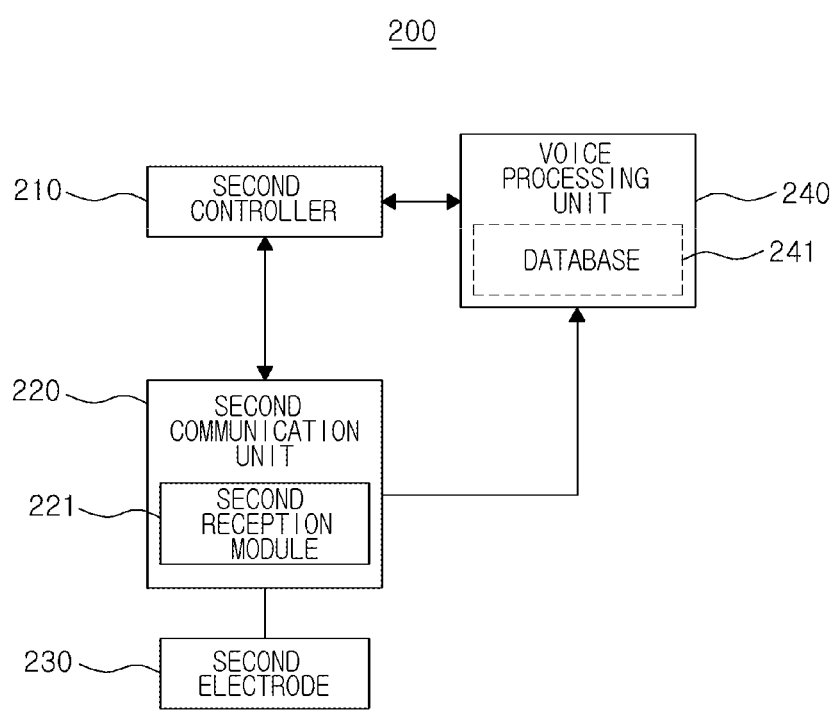
FIG. 3 is a schematic block diagram of a second human body communication device of the walking guidance apparatus using human body communication according to an exemplary embodiment of the present invention.

FIG. 3 is a schematic block diagram of the second human body communication device of the walking guidance apparatus using human body communication according to an exemplary embodiment of the present invention.

With reference to FIG. 3, the second human body communication device 200 includes a second controller 210, a second communication unit 220, a second electrode 230, and a voice processing unit 240.

The second controller 210 controls and manages operations of all the elements included in the second human body communication device 200.

The second communication unit 220 may include a second reception module 221, receive a signal transmitted by the first human body communication device 100 through the second electrode 230, demodulate the received signal, and provide the demodulated signal to the voice processing unit 240.

The second electrode 230 receives the signal, which has been transmitted by the first human body communication device 100, through the user's body in contact with the second electrode 230, and delivers the received signal to the second communication unit 220. To this end, the second electrode 230 is configured to be electrically connected to the second communication unit 220 and contacted by the user's body. Here, the contact includes a user's direct contact with the second electrode 230 and a user's contact in a state of wearing clothes or the like, rather than being in direct contact with the user's skin, while utilizing an antenna effect according to the material and size of the electrode.

The voice processing unit 240 processes the signal provided from the second communication unit 220 and outputs a voice signal allowing the user to listen to it.

In detail, the voice processing unit 240 may include a database 241 storing a voice to be outputted correspondingly according to location coordinates, and when the location coordinates are provided from the second communication unit 220, the voice processing unit 240 reads the voice message corresponding to the provided location coordinates from the database 241 and outputs the voice message, thus providing location information to the user. In order to output the voice message, the voice processing unit 240 may include a generally used audio speaker or may be configured to amplify a voice signal such that it fits an earphone (or headphone) output, and then provide a voice message.

Here, when the second human body communication device 200 is configured to receive location information as voice data from the first human body communication device 100 or any other external device, the voice processing unit 240 may be configured to include a digital signal processor (DSP) to convert the voice data provided from the second communication unit 220 into a voice signal that can be listened to by the user and output the same.

Alternatively, instead of being configured to output a voice signal corresponding to the provided walking guidance information through a speaker or an earphone terminal as described above, the voice processing unit 240 may utilize the method of human body communication currently under research and development, and in this case, the voice processing unit 240 may be configured to include an RF signal generation module, a voice signal synthesizing module, a band pass filter, an amplifying circuit, and the like, in relation to the human body communication technique.

Figure 4:
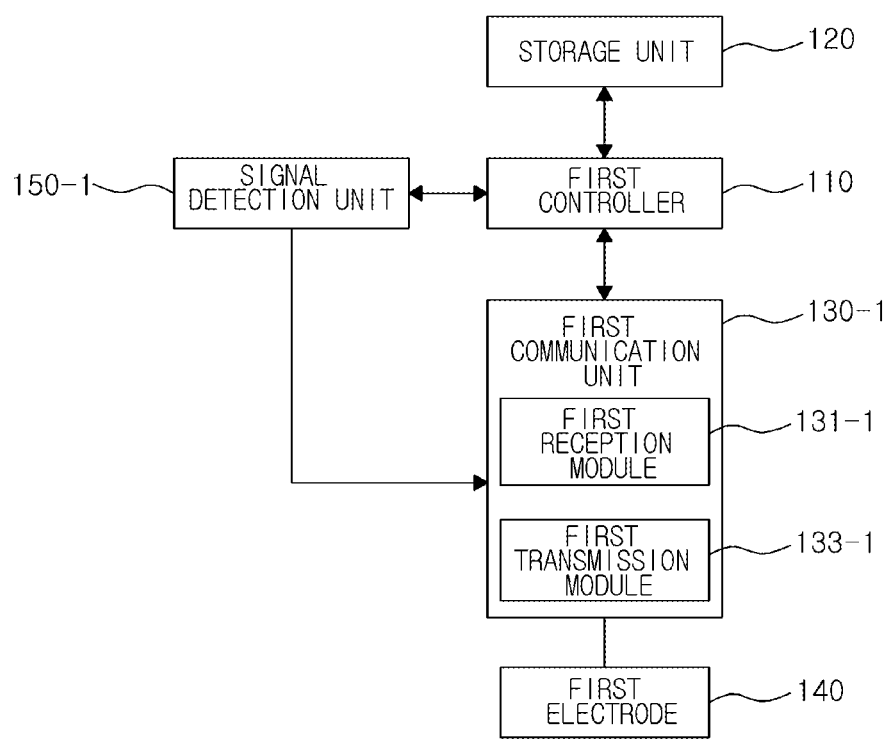
FIG. 4 is a schematic block diagram of a first human body communication device of the walking guidance apparatus using human body communication according to another exemplary embodiment of the present invention.

FIG. 4 is a schematic block diagram of a first human body communication device of the walking guidance apparatus using human body communication according to another exemplary embodiment of the present invention.

With reference to FIG. 4, a first human body communication device 100-1 according to another exemplary embodiment of the present invention includes a first controller 110, a storage unit 120, a first communication unit 130-1, a first electrode 140, and a signal detection unit 150-1.

The first controller 110 controls and manages operations of all the elements included in the first human body communication device 100, and manages user recognition and authentication information, and the like. For example, when the user comes into contact with an object (e.g., a stick) in which the first human body communication device 100 is installed, the first controller 110 compares predetermined user authentication information with user authentication information stored in the storage unit 120. When the predetermined user authentication information is identical to the stored user authentication information, the first controller 110 may activate the operation of the first human body communication device 100, otherwise when the predetermined user authentication information is not identical to the stored user authentication information, the first controller 110 may deactivate the operation of the first human body communication device 100.

The storage unit 120 stores recognition information or authentication information for user recognition or authentication under the control of the first controller 110.

The first communication unit 130-1 may include a first reception module 131-1 and a first transmission module 133-1. The first communication unit 130-1 processes a data signal detected by the signal detection unit 150-1 and then transmits the processed signal to the user's body through the first electrode 140 under the control of the first controller 110.

In detail, the first reception module 131-1 demodulates a signal detected by the signal detection unit 150-1 and transfers the demodulated signal to the first transmission module 133-1. Then, the first transmission module 133-1 modulates the signal transferred from the first reception module 131-1 according to a modulation control signal from the first controller 110 and transmits the modulated signal to the user's body through the first electrode 140. Here, the first transmission module 133-1 may modulate the received signal by employing various modulation methods generally used for a wireless communication technique. Preferably, the first transmission module 133-1 performs modulation according to a modulation method suitable for a human body communication standard.

The first electrode 140 performs a function of transmitting the signal which has been transferred from the first communication unit 130-1 to the user's body. The first electrode 140 may be installed to be electrically connected to the first communication unit 130-1 to perform the foregoing function and installed at a position in which it will be contacted by the user's body. The first electrode 140 may be formed to fit the shape of the object in which the first human body communication device 100-1 is installed and may be made of various materials.

The signal detection unit 150-1 may be configured as an RFID reader, a GPS reception module or an infrared ray sensor. For example, when the signal detection unit 150-1 is configured as an RFID reader, it can detect an RFID signal from an RFID tag installed on the road or a facility while the user is walking, and provides the detected signal to the first reception module 131-1.

Alternatively, when the signal detection unit 150-1 is configured as a GPS reception module, it provides a received GPS signal to the first reception module 131-1, and when the signal detection unit 150-1 is configured as an infrared ray sensor, it provides a signal corresponding to a detected infrared ray to the first reception module 131-1.

Figure 5:
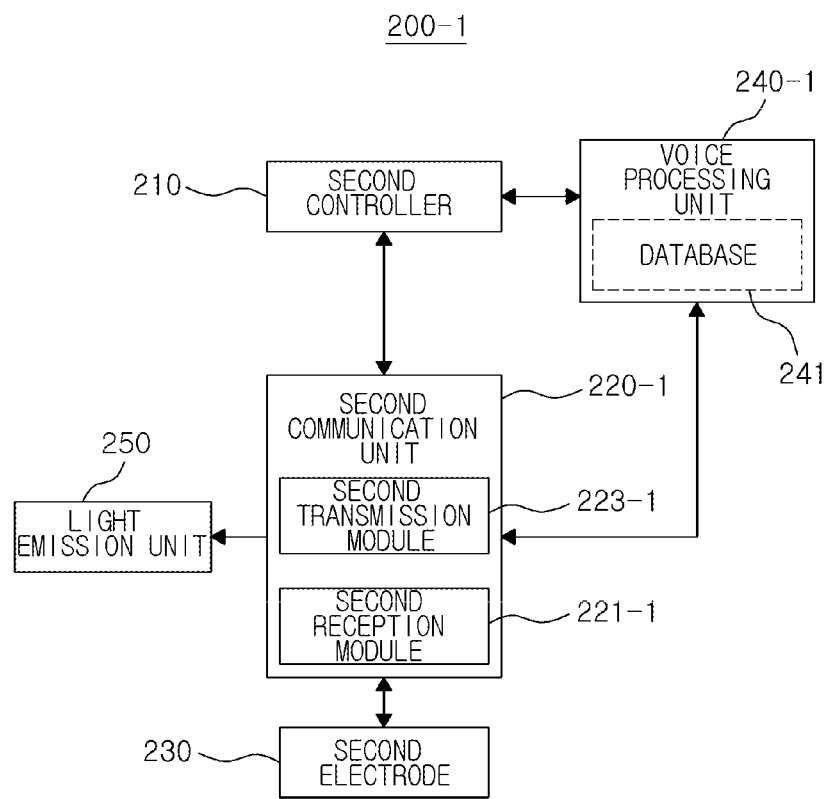
FIG. 5 is a schematic block diagram of a second human body communication device of the walking guidance apparatus using human body communication according to another exemplary embodiment of the present invention.

FIG. 5 is a schematic block diagram of a second human body communication device of the walking guidance apparatus using human body communication according to another exemplary embodiment of the present invention. Specifically, FIG. 5 shows the configuration of a second human body communication device 200-1 that can be used in an environment in which bi-directional visible light communication is supported according to a visible light communication regulation of an intelligent traffic system (ITS).

With reference to FIG. 5, the second human body communication device 200-1 according to another exemplary embodiment of the present invention includes a second controller 210, a second communication unit 220-1, a second electrode 230, a voice processing unit 240-1, and a light emission unit 250.

The second controller 210 controls and manages the operations of all the elements included in the second human body communication device 200.

The second communication unit 220-1 may include a second reception module 221-1 and a second transmission module 223-1. The second reception module 221-1 receives a data signal transmitted by the first human body communication device 100 through the second electrode 230, demodulates the received signal, and provides the demodulated signal to the voice processing unit 240-1. The second transmission module 223-1 modulates voice data transferred from the voice processing unit 240-1 and transfers the modulated voice data to the light emission unit 250.

The second electrode 230 receives the signal, which has been transmitted by the first human body communication device 100 through the user's body, through the user's body in contact with the second electrode 230, and delivers the received signal to the second communication unit 220-1.

The voice processing unit 240-1 may include a database 241 storing a voice message to be outputted correspondingly according to location coordinates, and when the location coordinates are provided from the second communication unit 220-1, the voice processing unit 240 reads the voice message corresponding to the provided location coordinates from the database 241 and outputs the voice message, thus providing location information to the user. In order to output the voice message, the voice processing unit 240-1 may include a generally used audio speaker or may be configured to amplify a voice signal such that it fits an earphone (or headphone) output, and then provide a voice message.

In addition, the voice processing unit 240-1 may include a microphone (not shown) in order to acquire a user's voice when the user, faced with an emergency situation or a disastrous situation, wants to transmit his voice to a predetermined destination by using bi-directional visible light communication.

In detail, the voice processing unit 240-1 digitally processes the user's voice which has been acquired through the microphone to convert the voice into a digital signal, and transfers the converted digital signal to the second transmission module 223-1.

The light emission unit 250 may include an LED element and a driving circuit for driving the LED element. The light emission unit 250 may transmit data through visible light generated by blinking the LED element according to a modulated signal from the second transmission module 223-1.

For the purpose of visible light communication as mentioned above, preferably, the light emission unit 250 is installed at a position at which a visible area can be secured when the second human body communication device 200-1 is attached to the user. Also, when the function of the light emission unit 250 is added to the first human body communication device 100 according to a user request, the first human body communication device 100 may be configured as a device in which an output signal from the second communication module 223-1 is transmitted via the second electrode 230 for bi-directional human body communication.

The second human body communication devices 200 and 200-1 according to the exemplary embodiments of the present invention illustrated in FIGS. 3 and 5 may serve as master devices when they communicate with human body communication devices other than the first human body communication devices 100 and 100-1 illustrated in FIGS. 2 and 4. The second human body communication devices 200 and 200-1 may be formed to be attached to the user's wrist in consideration of the user's accessibility and manipulation convenience. When the connection line of the earphone is desired to be minimized, the second human body communication devices 200 and 200-1 may be fabricated in a form that can be attached to a user's forearm and positioned close to a user's ear or may be fabricated in the form of a headset.

As set forth above, according to exemplary embodiments of the invention, the walking guidance apparatus using human body communication includes a first human body communication device installed in a stick, a walking aid, a wheel chair, and the like, the visually impaired, the handicapped, and so on, relay on, to detect a visible light, an infrared ray, an RFID signal, and a GPS signal, perform processing such as modulation on the detected signal, or the like, and transmit the processed signal through a user's body, and a second human body communication device attached to the user's body to process a signal transmitted through the user's body from the first human body communication device and output a voice that can be recognized by the user.

Because the walking guidance apparatus using human body communication uses visible light communication having a high utility and effectiveness and provides walking guidance information by using a human body as a communication channel, it provides the walking guidance information with high stability and accuracy.

In addition, the first human body communication device is installed in an object, such as a stick, always carried around by the user for walking and the second human body communication device is detachably attached to the user's body to acquire walking guidance information through the user's body, thus improving user convenience.

While the present invention has been shown and described in connection with the exemplary embodiments, it will be apparent to those skilled in the art that modifications and variations can be made without departing from the spirit and scope of the invention as defined by the appended claims.

What is claimed is:

1. A walking guidance apparatus using human body communication, the apparatus comprising:
    a first human body communication device configured to acquire a walking guidance information signal, convert the acquired walking guidance information signal into a transmission signal for the human body communication, and transmit the transmission signal through a user's body; and
    a second human body communication device configured to receive the transmission signal transmitted through the user's body from the first human body communication device, convert the received signal into a voice signal, and output the voice signal.

2. The apparatus of claim 1, wherein the first human body communication device comprises:
    an optical detection unit configured to detect a visible light data signal and convert the detected visible light data signal into an electrical signal;
    a first communication unit configured to output a modulated signal based on the electrical signal provided from the optical detection unit; and
    a first electrode configured to receive the modulated signal from the first communication unit and output the received modulated signal to the user's body as the transmission signal.

3. The apparatus of claim 2, wherein the first communication unit comprises:
    a first reception module configured to demodulate the electrical signal provided from the optical detection unit; and
    a first transmission module configured to receive the demodulated electrical signal from the first reception module and modulate the demodulated electrical signal to output the modulated signal that is transmittable through the user's body.

4. The apparatus of claim 3, wherein the first transmission module is configured to perform BPSK (Binary Phase Shift Keying) modulation.

5. The apparatus of claim 1, wherein the first human body communication device comprises:
    a first controller configured to perform user authentication by using predetermined authentication information when the first human body communication device is brought into contact with the user's body; and
    a storage unit configured to store user authentication information for authenticating the user.

6. The apparatus of claim 1, wherein the second human body communication device comprises:
    a second electrode configured to receive the transmission signal transmitted from the first human body communication device when brought into contact with the user's body;
    a second communication unit configured to demodulate the transmission signal received through the second electrode and output a demodulated signal; and
    a voice processing unit configured to process the demodulated signal to output the voice signal.

7. The apparatus of claim 6, wherein the voice processing unit is configured to generate the voice signal corresponding to the transmission signal which has been transmitted from the first human body communication device, and output the generated voice signal.

8. The apparatus of claim 7, wherein the voice processing unit comprises a database storing a voice message corresponding to the demodulated signal.

9. The apparatus of claim 8, wherein the voice processing unit further comprises a digital signal processing module configured to convert voice data into the voice signal and output the voice signal, when the demodulated signal is the voice data.

10. The apparatus of claim 8, wherein the voice processing unit is configured to provide the demodulated signal as a voice to the user by using human body sound communication.

11. The apparatus of claim 1, wherein the first human body communication device is configured to detect one of an RFID signal, an infrared signal, and a GPS signal to acquire the walking guidance information signal, convert the acquired walking guidance information signal into the transmission signal for the human body communication, and transmit the transmission signal through the user's body.

12. A walking guidance apparatus using human body communication, the apparatus comprising:
    a first human body communication device configured to detect a first visible light signal including walking guidance information, process the detected first visible light signal, and transmit the processed first visible light signal through a user's body; and
    a second human body communication device configured to receive the processed first visible light signal which has been transmitted through the user's body from the first human body communication device and process the received signal to output a first voice signal corresponding to the received signal, convert a second voice signal provided from the user into a second visible light signal, and output the second visible light signal.

13. The apparatus of claim 12, wherein the second human body communication device comprises:
    a second electrode configured to receive the processed first visible light signal, which has been transmitted from the first human body communication device, when brought into contact with the user's body;
    a second communication unit configured to demodulate the processed first visible light signal received through the second electrode to provide a demodulated signal, and modulate voice data to provide a modulated signal;
    a voice processing unit configured to process the demodulated signal to output the first voice signal, convert the second voice signal provided from the user into the voice data, and provide the voice data to the second communication unit; and a light emission unit configured to output the second visible light signal corresponding to the modulated signal provided from the second communication unit.

* * * * *